United States Patent
Gillett et al.

(10) Patent No.: US 6,764,784 B2
(45) Date of Patent: Jul. 20, 2004

(54) STANDARD PACKAGE DESIGN FOR BOTH ATMOSPHERIC AND PRESSURIZED SOFC POWER GENERATION SYSTEM

(75) Inventors: James E. Gillett, Greensburg, PA (US); Paolo R. Zafred, Murrysville, PA (US)

(73) Assignee: Siemens Westinghouse Power Corporation, Orlando, FL (US)

( * ) Notice: Subject to any disclaimer, the term of this patent is extended or adjusted under 35 U.S.C. 154(b) by 509 days.

(21) Appl. No.: 09/954,941

(22) Filed: Sep. 17, 2001

(65) Prior Publication Data

US 2003/0054209 A1 Mar. 20, 2003

(51) Int. Cl.$^7$ ................................................. H01M 8/04
(52) U.S. Cl. ............................. 429/17; 429/13; 429/24; 429/25; 429/31; 429/32; 429/34; 429/39
(58) Field of Search ............................. 429/31, 32, 34, 429/39, 13, 17, 24, 25

(56) References Cited

U.S. PATENT DOCUMENTS

| | | |
|---|---|---|
| 3,972,731 A | 8/1976 | Bloomfield et al. |
| 4,395,468 A | 7/1983 | Isenberg |
| 4,622,275 A | 11/1986 | Noguchi et al. |
| 5,169,730 A | 12/1992 | Reichner et al. |
| 5,413,879 A | 5/1995 | Domeracki et al. |
| 5,573,867 A | 11/1996 | Zafred et al. |
| 5,741,605 A | 4/1998 | Gillett et al. |
| 5,750,278 A | 5/1998 | Gillett et al. |
| 6,024,859 A | 2/2000 | Hsu |
| 6,255,010 B1 | 7/2001 | George et al. |
| 6,689,499 B2 * | 2/2004 | Gillett et al. .................. 429/13 |

OTHER PUBLICATIONS

Holmes et al. U.S. Ser. No. 09/784,610, filed Feb. 15, 2001.
Westinghouse Electric Corp. "Solid Oxide Fuel Cell", pp. 1–12, Oct. 1992.

* cited by examiner

Primary Examiner—Bruce F. Bell

(57) ABSTRACT

A fuel cell generator apparatus contains at least one fuel cell assembly module with at least one subassembly containing fuel cells, where the subassemblies are fueled at their base by a fuel feed injector attached to a fuel feed pre-reformer connected to fuel distribution manifolds; and where a module housing encloses the subassemblies and is in turn surrounded by a vessel having two ends providing a purge gas space between the housing and vessel; and where at least one fuel gas feed inlet, gaseous oxidant-purge gas feed inlet, and vessel exhaust gas outlet pass through the vessel; where the vessel can be used for pressurized or non-pressurized operation and is preferably tubular.

20 Claims, 4 Drawing Sheets

STANDARD PACKAGE DESIGN FOR BOTH ATMOSPHERIC AND PRESSURIZED SOFC POWER GENERATION SYSTEM

BACKGROUND OF THE INVENTION

1. Field of the Invention

The invention relates to solid oxide electrolyte, fuel cell generator modules, modules disposed in a common pressure vessel for use with a variety of auxiliary components in a power generation system operating in either an atmospheric or pressurized mode.

2. Description of the Prior Art

Fuel cell based, electrical generator apparatus utilizing solid oxide electrolyte fuel cells ("SOFC") arranged within a housing and surrounded by insulation are well known, and taught, for example, by U.S. Pat. No. 4,395,468 (Isenberg) and "Solid Oxide Fuel Cell", Westinghouse Electric Corporation, October, 1992. The tubular type fuel cells can comprise an open or closed ended, axially elongated, self-supporting ceramic tube air electrode material, completely covered by thin film ceramic, solid electrolyte material. The electrolyte layer is covered by cermet fuel electrode material, except for a thin, axially elongated, interconnection material. Flat plate type fuel cells can comprise a flat array of electrolyte and interconnect walls, where electrolyte walls contain thin, flat layers of cathode and anode materials sandwiching an electrolyte. The "corrugated" plate type fuel cells can comprise a triangular or corrugated honeycomb array of active anode, cathode, electrolyte and interconnect materials. Other fuel cells not having a solid electrolyte, such molten carbonate fuel cells are also well known, and can be utilized in the article and method of this invention.

Development studies of SOFC power plant systems have indicated the desirability of pressurized operations in many instances. This would permit operation with a coal gasifier as the fuel supply and/or use of a gas turbine generator as a bottoming cycle. Integration is commercially possible because of the closely matched thermodynamic conditions of the SOFC module output exhaust flow and the gas turbine inlet flow.

Conventional combustor in a gas turbine system typically exhibits high nitrogen oxides ($NO_x$) emissions, combustion driven oscillations and instabilities, excessive noise and low efficiencies. Although significant advances have been made to mitigate these problems, it has proved difficult to design a practical, ultra-low $NO_x$, high-turn-down ratio combustor due to poor flame stability characteristics. The combination of all the above factors results in a pressurized SOFC generator module design being suitable as a replacement of conventional gas turbine combustor and applicable to more efficient combined cycle power plants required to meet increasingly stringent emission targets.

A variety of fuel cell uses in power plant systems are described in the literature. U.S. patent application Ser. No. 09/784,610, filed on Feb. 15, 2001, Holmes et al.) discloses a low-cost atmospheric SOFC power generation system, which provides a simpler, significantly less expensive oxidant/air feed tube support system and an improved power lead design. The inexpensive design minimizes cooling requirements, external ducting to auxiliaries such as air blowers, air pre-heaters and recuperators and provides better utilization of interior insulation. In U.S. Pat. No. 3,972,731 (Bloomfield et al.), a pressurized fuel cell power plant is described. There, air is compressed by compressor apparatus, such as a compressor and turbine which are operably connected, which is powered by waste energy produced by the power plant in the form of a hot pressurized gaseous medium, such as fuel cell exhaust gases. These exhaust gases are delivered into the turbine, which drives the compressor for compressing air delivered to the fuel cells. In U.S. Pat. No. 5,413,879 (Domeracki et al.) a SOFC is also integrated into a gas turbine system. There, pre-heated, compressed air is supplied to a SOFC along with fuel, to produce electric power and a hot gas, which gas is further heated by combustion of unreacted fuel and oxygen remaining in the hot gas. This higher temperature gas is directed to a topping combustor that is supplied with a second stream of fuel, to produce a still further heated gas that is then expanded in a turbine. Gillett et al., in U.S. Pat. No. 5,750,278 taught a self-cooling, mono-container fuel cell generator design with integral cooling ducts that could be used for both atmospheric and pressurized operation. The atmospheric and pressurized design, however, would be housed in different containment vessels. In U.S. Pat. Specification No. 5,573,867 (Zafred et al.) a pressurized modular design SOFC generator was housed in a transportable, low center of gravity, horizontally disposed pressure vessel which also allowed purge gas passage between the inside of the pressure vessel and the outside of the SOFC modules. That design contained six separate gas entrance/exit lines just on one end of the container contributing to the substantial cost of pressurized systems over atmospheric systems which usually have less complicated external containment design.

Fuel cell pressurization, while advantageous in system performance, presents several practical difficulties to the SOFC generator designer, two of which are: (1) The pressure boundary must be able to withstand pressures up to 20 atmospheres. The pressure boundary of existing generators operating at one atmosphere pressure is the outside SOFC generator wall, which typically operates at temperatures between 600° C. and 800° C. Construction of a pressure boundary to operate at 20 atmospheres and 800° C. is difficult and expensive, therefore, a pressure boundary with reduced wall temperature is required; (2) Because fuel and air are brought together within the SOFC generator, much more care must be taken to avoid the potential of an unstable condition during startup and operation of a pressurized SOFC. This is only a limited concern at one atmosphere. For atmospheric operation, the expected explosive overpressure would be about 115 psi (792 kPA) which existing designs can accommodate by mechanical strength alone. However, the expected explosive overpressure at 20 atmospheres is about 2315 psi (15950 kPA). A protective containment system to prevent the accumulation of an explosive gas mixture is required; (3) the pressurized containment design is usually much more complicated and expensive than that of atmospheric systems. What is needed is a new packaging approach in the overall configuration of a SOFC power generating plant by maintaining a standardized generator module which could be easily reconfigured for inlet and exhaust duct routings in such a way that it can be coupled to a recuperator/duct burner module, to operate as an atmospheric unit, or to a gas turbine, to operate in a pressurized mode.

In view of this, the main objects of this invention are to: (1) provide a standard stack configuration for both atmospheric and pressurized SOFC Modules, (2) provide a common tank design for both systems, (3) reduce assembly time of the generator stack by reducing the number of installed parts, (4) reduce part inventories, (5) improve functionality of the system, (6) improve generator serviceability/ maintainability issues, by providing simple means for stack insertion/extraction within the tank, (7) increase the availability of the fuel cell generator, (8) improve the overall efficiency and performance of the power generation system, and (9) ultimately offer a cost-effective solution to the pressing demand for compact, standard, low cost SOFC systems.

SUMMARY OF THE INVENTION

The above needs and objects are met by providing a fuel cell generator apparatus characterized by containing at least one fuel cell assembly module comprising at least two side by side subassemblies each containing a plurality of fuel cells, each fuel cell having electrolyte between an oxidant electrode and a fuel electrode; where the subassemblies are each fueled at their base by a common fuel feed injector nozzle attached to a fuel feed pre-reformer which is connected to integral fuel distribution manifolds; a module housing capable of withstanding temperatures over 600 C. enclosing the fuel cell assembly module; an axially-elongated thin wall vessel surrounding the module housing, the vessel having two ends; a purge gas space between the module housing and the pressure vessel; at least one fuel gas feed inlet through the vessel and connecting to the fuel feed injector nozzles; common gaseous oxidant-purge gas feed inlet; exhaust gas outlet through the vessel connecting to a combusted gas exit plenum through a semi-flexible duct; insulation contacting the inside of the vessel within at least part of the purge gas space; where the vessel is adapted to be used for either atmospheric gaseous feed of pressurized gaseous feed. The fuel cells will generally operate at temperatures usually over 650° C. and up to about 1100° C. The module housing and the fuel cells can operate in the "pressurized" mode, that is over at least about 2 atmospheres, or about 28.5 psi (pounds per square inch—196.4 kPA), preferably at about 2 to 10 atmospheres. During operations, the entire purge area is flooded by the gaseous oxidant which passes around the module housing to provide a uniform temperature distribution and eliminate the need for complicated integral cooling ducts. Preferably the vessel surrounding the module housing is cylindrical.

The invention also resides in a method of operating a fuel cell generator apparatus characterized by the steps of: (1) passing a common gaseous oxidant-purge feed gas and a fuel gas feed through inlets and into at least one fuel cell assembly module, each module comprising at least two side by side subassemblies, each containing a plurality of fuel cells, each fuel cell having electrolyte between an oxidant electrode and a fuel electrode, where the modules are each enclosed by a module housing capable of withstanding temperatures over 600° C.; where the module housings are surrounded by an axially-elongated vessel having two ends, such that there is a purge gas space between the module housings and the vessel; (2) passing the common gaseous oxidant-purge gas through the pressure vessel to circulate within the purge gas space, where the gas dilutes any unreacted fuel gas flow from the module; and (3) passing exhaust gas and circulated purge gas and any unreacted fuel gas out of the pressure vessel, where the vessel is adapted to be used for wither atmospheric gaseous feed or pressurized gaseous feed.

The generator apparatus will also have associated with it and will be working in cooperation with well known auxiliaries, such as controls; an oxygen or air pre-heater; a fuel gas compressor; a fuel desulfurizer; an oxygen or air compressor which may be operably connected to a power turbine coupled to an electric generator; a purge gas compressor, which may be the same as the air compressor; a source of fuel gas and purge gas; heat exchangers; a heat recovery unit to recover heat from the hot fuel cell exhaust gases; and a topping combustor, to provide an electrical power generation system. This type power system, in the pressurized mode, could be, for example, part of an integrated, coal gasification/fuel cell-steam turbine combination power plant, featuring a plurality of coal gasifiers and fuel cell generator arrays or power blocks with associated DC/AC conversion switchgear or it could also be part of a natural gas fired combustion turbine system or the like.

BRIEF DESCRIPTION OF THE DRAWINGS

For a better understanding of the invention, reference may be made to the preferred, non-limiting embodiments exemplary of the invention, shown in the following drawings, in which.

DESCRIPTION OF THE PREFERRED EMBODIMENTS

Figure 1:
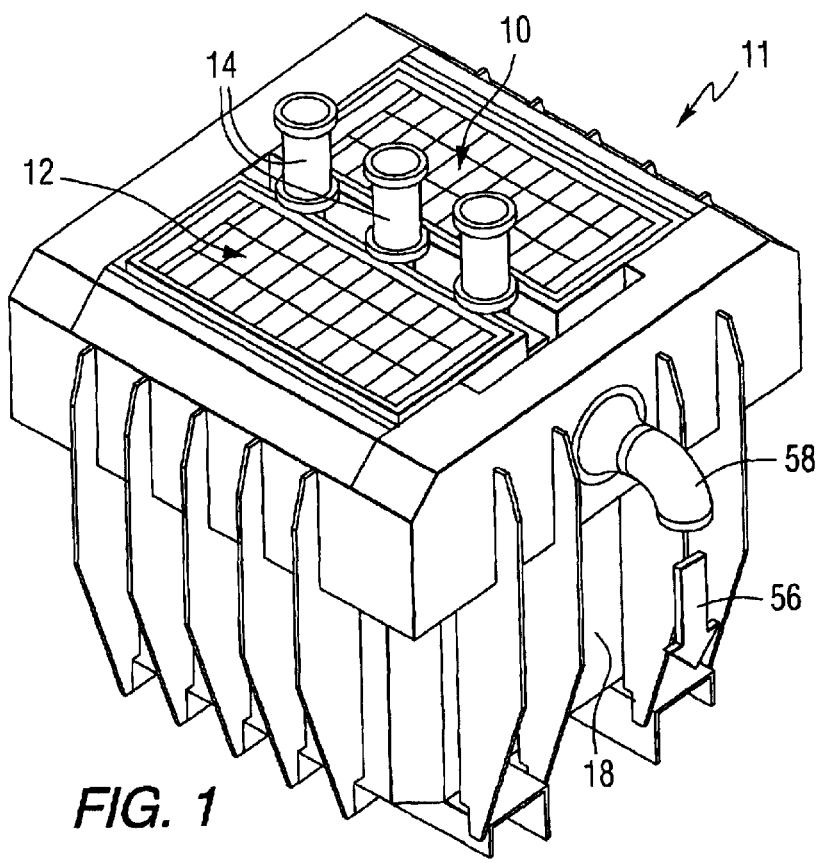
FIG. 1, shows a three dimensional top view of a fuel cell stack assembly module in a surrounding module housing, where fuel pre-reformers are between the assembly modules.

The fuel cells used inside the generator apparatus of this invention can be solid oxide electrolyte or molten carbonate fuel cells of any type or configuration. However, for purposes of simplicity, tubular, solid oxide electrolyte fuel cells will be discussed as an exemplary type useful in this invention, and the description herein-after will generally relate to that type, which shall in no way be considered limiting as to the scope of the invention.

Solid oxide electrolyte fuel cells (SOFC) are highly efficient devices that convert chemical energy into electricity. They operate at atmospheric or elevated pressures at a temperature of approximately 1000° C. to produce electricity using a variety of fossil fuels such as coal derived fuel gas, natural gas, or distillate fuel. The temperature of the exhaust gases from the cells is between 850° C. and 950° C., a temperature which is attractive for co-generation applications or for use in bottoming cycles for all-electric central station power plants.

An operating SOFC readily conducts oxygen ions from an "air" electrode (electrode which air or oxidant contacts-cathode), where they are formed, through a solid electrolyte to a "fuel" electrode (electrode which fuel contacts-anode). There they react with carbon monoxide (CO) and hydrogen ($H_2$) contained in the fuel gas to deliver electrons and produce electricity. The tubular SOFC features a porous air electrode made of doped lanthanum manganite. A gas-tight electrolyte of yttria-stabilized zirconia (approximately 40 micrometers thick) covers the air electrode, except in a strip about 9 mm wide along the entire active cell length. This strip of exposed air electrode is covered by a thin, dense, gas tight layer of doped lanthanum chromite. This layer, termed the cell interconnection, serves as the electric contacting area to an adjacent cell or to a power contact. The fuel electrode is a nickel-zirconia cermet and covers the electrolyte surface except in the vicinity of the interconnection.

For operation, gaseous oxidant, typically air is introduced into the fuel cell, generally through an air feed tube. The air, discharged near the closed end of the cell, flows through the annular space formed by the cell and its coaxial feed tube. Gaseous fuel flows on the outside of the cell. Typically, 85% of the fuel is electrochemically utilized (reacted) in the active fuel cell section. The gas-impervious electrolyte does not allow nitrogen to pass from the air side to the fuel side, hence the fuel is oxidized in a nitrogen free environment, averting the formation of $NO_x$. At the open end of the cell, the remaining fuel is reacted with the air stream exiting the cell, thereby providing additional useful heat. Reformation of natural gas and other fuels containing hydrocarbons can be accomplished, if desired, externally or within the generator. Incoming fuel can be reformed to $H_2$ and CO within the generator, eliminating the need for an external reformer. All the gas flows and reactions are controlled within the generator apparatus.

To construct an electric SOFC generator, individual cells are bundled into an array of series-parallel electrically connected fuel cells, forming a structure that is a basic generator building block. The individual bundles are arrayed in series to build generator voltage and to form submodules. The parallel electrical connection of the cells within a bundle enhances generator reliability. Submodules are further combined in either parallel or series connections to form the generator module. For a more complete description of tubular fuel cells and their operation in a generator apparatus, reference can be made to U.S. Pat. No. 4,395,468 (Isenberg).

Referring now to FIG. 1 of the drawings, one embodiment of two fuel cell stack subassembly modules 10 and 12, in fuel cell assembly module 11, leading to a fuel conditioner/pre-reformer section are shown with feed fuel ducts 14. The module housing 18 can contain one or subassembly modules with any associated recirculation plenums and pre-reformer assemblies. The module housing must withstand fuel cell operating temperatures of 800° C. to 1100° C. and must be made of material, generally metal, capable of withstanding temperatures of 600° C., such as iron, steel, stainless steel or nickel alloy. The housing 18 is shown, with cooling fins but it can be other configurations. Also shown is one example of an exhaust outlet for the fuel cell assembly module to remove exhaust gas 56.

Figure 2:
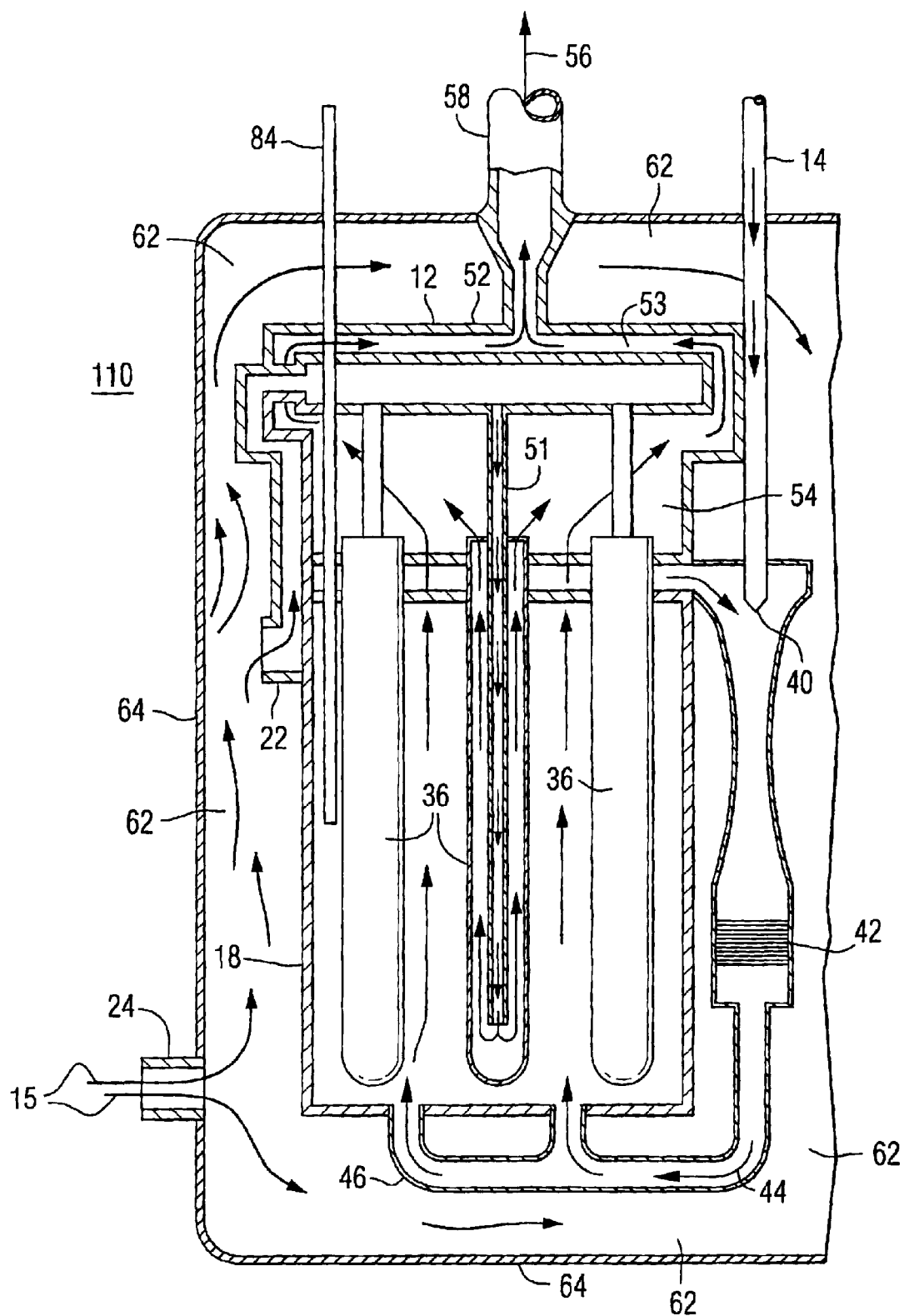
FIG. 2, shows one embodiment of a gas flow schematic of a fuel cell generator apparatus.

FIG. 2 is a gas flow schematic of one embodiment of a possible fuel cell generator apparatus 110 design simplified for purposes of clarity. Main oxidant entry 24 for the air/purge gas 15 is shown on the side of the vessel 64 for purposes of illustrating gas flow, but it is on the end (not shown) of the pressure vessel or at the bottom of the vessel 64 which can be a cylindrical pressure vessel. The entry of oxidant into the module housing can be on the sides, top or bottom. In any case, as can be seen, the oxidant, which can be pressurized, is not constrained within any piping or ducts as for example fuel entry duct 14, but passes into and occupies the purge gas space 62 before entering the module 18. While one type of oxidant entry from module oxidant inlet 22 to the fuel cells 36 is shown, any suitable ducting is within the invention.

FIG. 2 also shows fuel cell bundles, each bundle containing a plurality of interconnected fuel cell 36 bundles, here shown as containing the tubular SOFC type, with electrodes and sandwiched electrolyte. The housing 18, must contain interior insulation and may have exterior insulation partly between the housing and the surrounding vessel 64 to allow use of metals described above as the housing material. The exterior insulation can contain cooling ducts around its periphery. Any insulation 66, shown in FIG. 3, that is used would be gas permeable and from about 40 vol. % to 90 vol. % porous, and preferably would be alumina-silica fiber board. Fuel would enter fuel inlet duct or piping 14 and pass, preferably to one or more ejectors 40, where recirculation gases may inject-mix with feed fuel, to provide a stream useful in the fuel conditioning or pre-reforming section 42, where it is at least partially reformed, and to otherwise provide optimal operating conditions. The fuel stream 44 then exits pre-reformer 42 and passes through a fuel plenum or manifold 46 and into fuel supply lines which transfer or pass at least partly reformed fuel to the outside of the fuel cells 36, as shown in FIG. 2, where the fuel reacts along the elongated fuel electrode surface on the exterior of the tubular fuel cells 36. The fuel can be more complete reformed within the fuel bundles.

As shown in FIG. 2, atmospheric or pressurized oxidant enters an air/purge gas manifold, which can be of any suitable configuration, to an air distribution plenum, and then passes downward via individual oxidant feed tubes 51, shown in FIG. 2 into the bottom interior of each fuel cell 36, where, as is well known in the art, the oxidant reverses flow and passes in the annular space between the oxidant feed tube and the interior air electrode, where it reacts along the air electrode interior surface. The reacted oxidant finally enters a combustion chamber section 54 as spent oxidant. The spent oxidant then combusts with spent fuel, and some remaining unreacted feed fuel, to provide exhaust gas 56, which passes through a combustion or combusted gas plenum 53 to exhaust duct 52 shown here for purposes of simplicity as passing through being at the top of the pressure vessel, but exhaust flow is more correctly shown in FIG. 1. Part of the spent fuel may also be recirculated to the ejector 40, as shown in FIG. 2. A power lead 84 is also shown in FIG. 2. Further details on these flow patterns as well as use of an ejector system can be found in U.S. Pat. No. 5,169,730 (Reichner).

Very importantly, especially during pressurized operation, it may be possible, that some fuel is not utilized, that small volumes of unreacted fuel have the opportunity to diffuse or leak into the gas space 62 outside the fuel cell assembly modules and module housing. Any unreacted fuel outside module housing wall 18 may ignite under certain conditions because the auto ignition temperature of feed fuel, such as hydrogen, is about 520° C. As described previously, fuel leakage into volume, or space 62, which has a temperature gradient from 25° C. to 600° C. could possibly provide an unstable/combustion problem. Use of the oxidant as a purge gas provides a means to control the possibility of such combustion, and an even more dramatic situation if the source of oxygen should be cut off as by shutdown of the compressor of an associated turbine generator.

Figure 3:
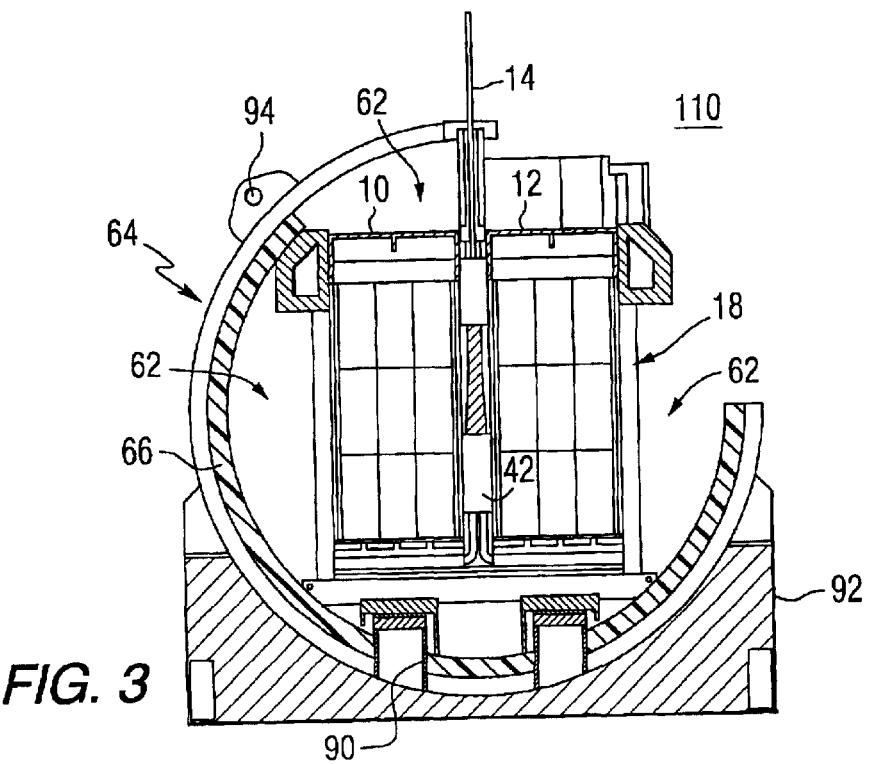
FIG. 3, shows a cross sectional view of several fuel stack assembly modules in a pressure vessel.

As shown in FIG. 3, control of unwanted, excess, unreacted fuel is provided in the gas space volume 62 outside the module housing 18, or canister, around the fuel cell subassembly modules 10 and 12. The generator fuel cell stack modules are enclosed within a low temperature vessel 64 which can be used as a high strength pressure containment vessel. The module housing, or canister, 18 around the cell stack separates feed fuel from the purge gas. This invention also creates conditions, in pressurized operation, that if fuel leaks into the purge gas it will ignite locally instead of accumulating to form an explosive mixture. However, the purge gas pressure will be kept higher than the gaseous fuel pressure so that under most pressurized circumstances, purge gas will keep gaseous fuel out of the purge gas space 62.

FIG. 3 shows SOFC modules within the module housing 18 surrounded in part by thermal insulation 66, which can, for example be about 12–15 cm thick, contained within the vessel 64. The insulation 66 would contain a great many minute passageways within its bulk volume where, even if the entire purge volume were filled with insulation, such insulation would still act as an accumulation for purge oxidant. As mentioned previously, the insulation is usually alumina-silica based, and preferably of 70 vol. % to 90 vol. % porosity, that is, from 10% of theoretical density to from 30% of theoretical density.

Since the SOFC's operate at temperatures near 1000° C., thermal insulation 66 is usually required between the inner canister, that is the module housing 18, and the vessel 64 wall to prevent high temperatures at the vessel wall. Using ceramic fiber board or blanket insulation with the purge gas volume 62 and possible air cooling of the module housing 18, vessel wall temperatures between 25° C. and 150° C. are achievable, so that the vessel can be constructed of carbon steel, which is a relatively inexpensive material. Air is supplied to the inside of the SOFC's through for example, a flow sensor, and air feed tubes (neither shown) from a compressor. A portion of the fuel and process air is combined electrochemically within the SOFC's to produce DC current, heat and fuel oxidation products. The unconsumed fuel is burned in air in the combustion chamber above the cells. Power leads 84 are also shown.

In operation, fuel and oxidant/purge gas, will all be pressurized as described previously. In this invention the oxidant/purge gas will have a higher pressure than the fuel. The oxidant/purge gas passes into the purge gas volume 62 and circulates around the fuel cell stack subassembly modules, such as 10 and 12 between the module housings 18 and the vessel 64. This circulation of combination oxidant/purge gas will dilute any unreacted feed fuel which might have migrated/leaked from the modules or, usually will leak into the fuel. The flow rate of the oxidant/purge gas, will be in an amount effective to provide SOFC operation and also prevent an explosive mixture of purge gas and fuel gas. Also shown in FIG. 3 are module supports 90 and 92 and pressure vessel lifting holes 94.

Figure 4:
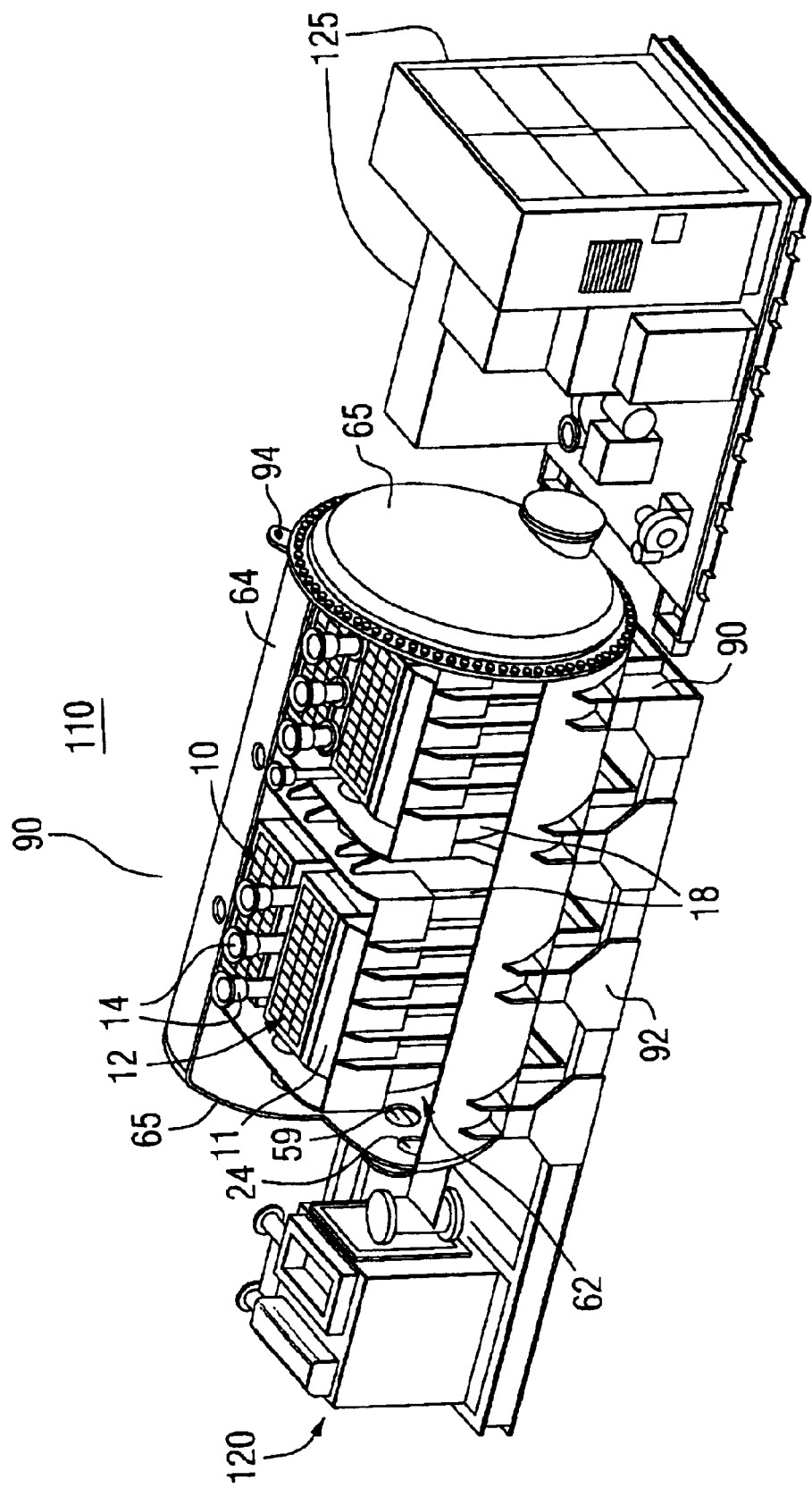
FIG. 4, shows a cut-away three dimensional view of one embodiment of a fuel cell generator apparatus containing two fuel cell assembly materials adapted for atmospheric operation.
Figure 5:
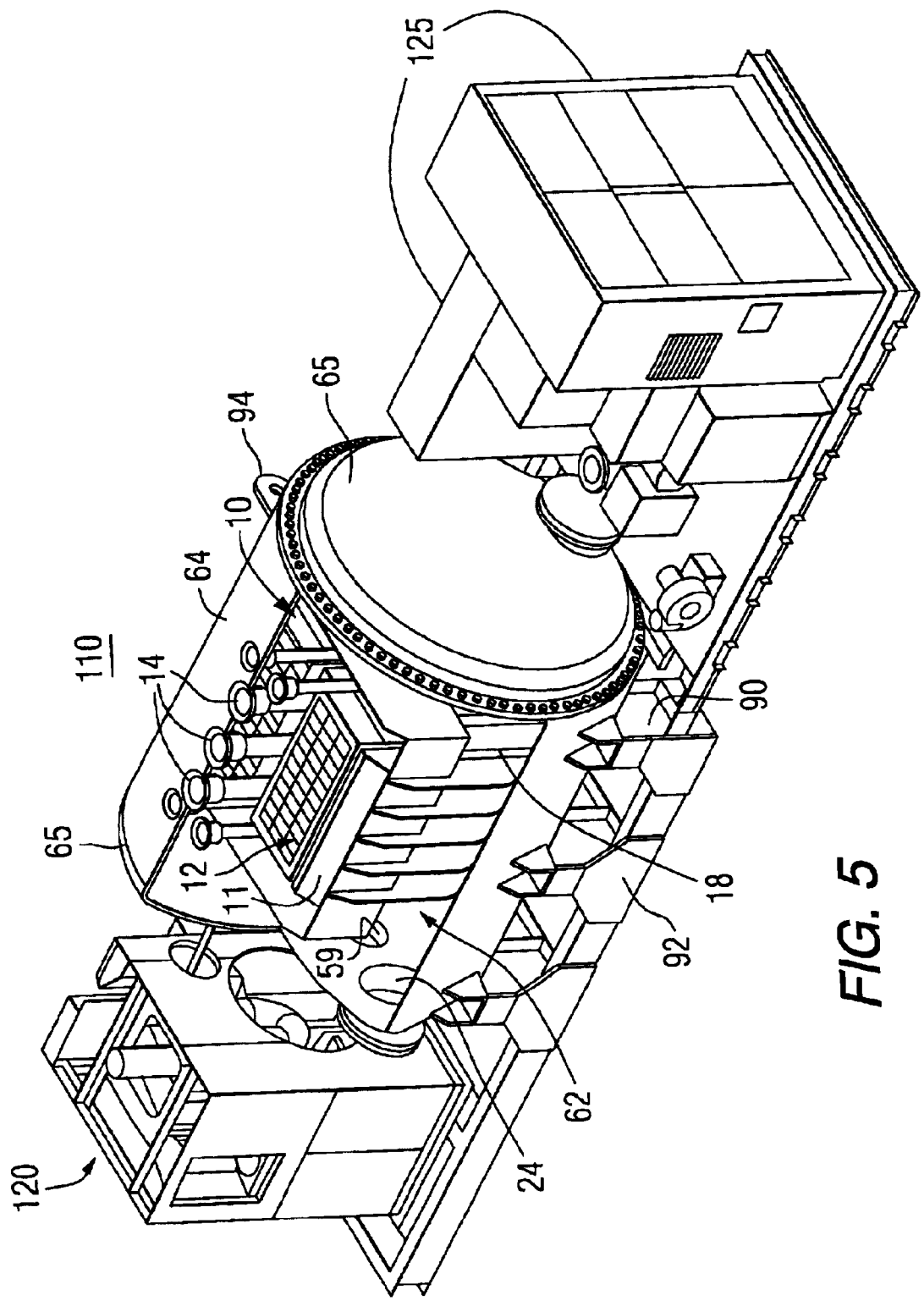
FIG. 5, shows a cross-sectional view of a fuel cell generator apparatus containing one fuel cell assembly module adapted for pressurized operation.

FIGS. 4 and 5 illustrate pressure vessel and fuel cell generator apparatus 110 adapted to be useful for wither atmospheric gaseous feed or pressurized gaseous feed. FIG. 4 has two fuel cell assembly modules, 11 and FIG. 5 one, each having two side by side fuel cell stack subassemblies 10 and 12 in module housing 18 containing the fuel cells (not shown). The modules are surrounded by an axially elongated thin wall vessel 64 which is capable of resisting high pressures in the application shown in FIG. 5. The vessel is from about 0.5 cm to about 1.0 cm thick and has two ends 65, so that there is a purge gas space 62 between the housing 18 and the pressure vessel 64. The vessel 64 has at least one fuel gas feed inlet 14 preferably at the top of the vessel 64 connecting to fuel feed injector nozzles and pre-reformer (not shown) inside the fuel cell assembly module 11. Common oxidant-air gas feed entry 24 preferably through an end 65 of the vessel 64 passes oxidant to the purge gas space 62. The generator apparatus main vessel exhaust gas outlet 59, is also partially shown, and is connected to a combustion gas exit plenum 53 and exhaust outlet 58 for the fuel cell assembly module (shown in simplified form in FIG. 2) but through a semi-flexible duct. The main vessel exhaust gas outlet 59 passes through an end 65 of the vessel 64. Insulation, shown as 66 in FIG. 3 contacts the inside of he pressure vessel within the purge gas space. Supports 90 and 92 and lifting holes 94 are also shown. System 120 houses an air supply system (blower & recuperator) in FIG. 4, and a microturbine (compressor and gasifier) in FIG. 5. And system 125 houses controls, power conditioner (DC/AC inverter) and instrumentation cabinets. The standard fuel cell generator apparatus configuration 110 of FIGS. 4 and 5 represents a major cost reduction effort achieved through design simplifications, innovative air/exhaust distribution system solutions, and repackaging of BOP components. As a result, first-time engineering costs normally ascribed to atmospheric and pressurized systems typical of a conventional design, are drastically reduced. Further, manufacturing costs are greatly reduced because of components commonalties between the two offerings. Also commercial product image is enhanced by the fact that one standard design satisfies different customer needs, that is high efficiency with a pressurized system (FIG. 5) for lower cost/kWe with an atmospheric unit (FIG. 4). Because of its modular stack design, the proposed standard generator apparatus concept is scalable and it may be applied to large size MW units thus achieving substantial economy of scale. This approach can be used across all product lines.

This invention is a modular standard SOFC generator having at least one standard fuel cell assembly module generally comprising two subassemblies of substacks, side by side, each fueled at the base of their fuel cells by a common fuel prereformer with integral fuel distribution manifolds and common recirculation plenum. Each subassembly 10 and 12 usually contains 36 bundles arranged in 12 bundle-rows of 3 bundles each, for a total of 864 tubular cells.

Typically an atmospheric generator apparatus power plant (FIG. 4) will have two standard fuel cell assembly modules for a total of 3456 cells, equivalent to three stacks of the current "100 kW" class configuration. A pressurized generator apparatus power plant (FIG. 5) will usually have one standard fuel cell assembly module for a total of 1728 cells.

Both power plant configurations utilize one standard horizontal vessel or tank, 64, preferably of tubular design, supported by a continuous saddle anchored to the shipping skid. The tank is a thin wall cylindrical steel shell with two ellipsoidal vessel heads or ends 65, cold formed from the same material as the shell and welded on one end to a sacrificial cylindrical extension. As a result no heavy flanges, gaskets and bolting is required, thus reducing weight, tank fabrication cost and eliminating any possibility of leakage.

A simple, low cost, automatic orbital welding machine with integral cutting/beveling tool could be used to close the tank end when installation of the fuel cell assembly module is completed, or open when stack servicing/replacement is required. Because of the tank thin wall, this operation could be completed in less than two hours, including rail and tooling set-up.

The inner wall of the vessel 64 is thermally insulated with a number of high performance insulation panels anchored to studs welded to the wall. This insulation system is intended to satisfy three principal requirements: reduce the tank outer surface temperature to a safe value, about 60° C. (140° F.); withstand high inlet air velocity erosion; and withstand depressurization transients, in a pressurized system. During operation, the entire internal tank volume is flooded with incoming process air which is diverted around the outer surface of the stack metal container to provide a uniform temperature distribution over the entire structure and more important, to sweep any fuel leakage from the stacks, thus effectively purging the entire space or cavity 62. Exhaust gas is diverted from each substack combustion zone to the side ducts which are subsequently manifolded and connected to the main vessel exhaust outlet or nozzle 59 through a semi-flexible duct made of high temperature ceramic material or equivalent.

Desulfurized natural gas is injected through each ejector nozzle, three per standard stack, which entrains depleted fuel gas extracted from the upper region of the cell stack. This fuel mixture is then directed to a pre-reforming chamber 42, in FIGS. 2 and 3, where reformation of higher hydrocarbons occurs within a catalyst bed. The partially reformed fuel stream then exits the pre-reformer and is uniformly distributed to a network of horizontal manifolds installed at the base of the cell stack. Each manifold includes a number of vertical tubes that transport the fuel mixture to the top of the in-stack reformer pocket. The balance of fuel reformation occurs in this area and a hydrogen rich fuel stream is fed to a network of channels located beneath the cell stack. The fuel is then supplied uniformly throughout the cell stack through a fuel distribution board which directs the flow upward along the fuel electrode surface of each cell 36 in FIG. 2. Each subassembly 10, 12 has a positive and negative power lead, 84 in FIG. 2, penetrating the top of the tank or vessel 64. Subassembly series connection is made externally through a DC bus bar connecting the opposite the opposite voltage terminals. These power leads allow for differential thermal growth between the substack busbars and the tank are electrically insulated to ensure dielectric integrity between the high voltage leads and the grounded metallic tank. As an alternative, an internal electrical jumper could be used for interconnection between the stacks.

An internal support structure is designed to allow for horizontal insertion/extraction of the fuel cell assembly into the tank. This facilitates shipping of the fuel cell assembly separately from the power modules and allows quick replacement in case of stack refurbishment. The package design object of the present invention is a flexible system which allows for dual configuration market offerings without being inordinately expensive. The fuel cell assembly module 11 in FIG. 1 is the same for both atmospheric and pressurized systems and so is the fuel supply system and the unit control module which the only difference is in the use of a recuperator/duct burner/blower assembly for the atmospheric unit of FIG. 4, or a gas turbine for the pressurized unit of FIG. 5. Additional advantages of the proposed standard generator assembly construction include ease of assembly, adaptability to sourcing tank, skids and components in the country where the installation resides, better serviceability and stack replacement capability.

While the invention has been described in terms of preferred embodiments, various changes, additions and modification may be made without departing from the scope of the invention as set forth in the following claims.

What is claimed is:

1. A fuel cell generator apparatus comprising:
   at least one fuel cell assembly module comprising at least two side by side subassemblies each containing a plurality of fuel cells, each fuel cell having electrolyte between an oxidant electrode and a fuel electrode where the subassemblies are each fueled at their base by a fuel feed injector attached to a fuel feed pre-reformer which is connected to fuel distribution manifolds;
   a module housing capable of withstanding temperatures over 600 C. enclosing the fuel cell assembly module;
   an axially-elongated thin wall vessel surrounding the module housing, the vessel having two ends;
   a purge gas space between the module housing and the vessel;
   at least one fuel gas feed inlet through the vessel and connecting to the fuel feed injector;
   common gaseous oxidant-purge gas feed inlet through the vessel;
   exhaust gas outlet through the vessel connecting to a combusted gas plenum associated with the fuel cell assembly module through a semi-flexible duct;
   insulation contacting the inside of the vessel within at least part of the purge gas space; and where the vessel is adapted to be used for either atmospheric gaseous feed or pressurized gaseous feed.

2. The fuel cell generator apparatus of claim 1, wherein both oxidant-purge gas and fuel feed gas are pressurized, the oxidant-purge gas consists essentially of air, and the vessel is tubular.

3. The fuel cell generator apparatus of claim 1, wherein the purge gas space contains insulation having a porosity of from about 70 vol. % to about 90 vol. %.

4. The fuel cell generator apparatus of claim 1, wherein the fuel cells are tubular solid oxide electrolyte fuel cells.

5. The fuel cell generator apparatus of claim 1, wherein the fuel gas feed inlet is through the top of the vessel.

6. The fuel cell generator apparatus of claim 1, wherein the gaseous oxidant-purge gas feed inlet and the exhaust gas outlet pass through an end of the vessel.

7. A method of operating a fuel cell generator apparatus comprising:
   (1) passing a common gaseous oxidant-purge gas and a feed fuel gas through inlets and into at least one cell assembly module, each module comprising two side by side subassemblies, each containing a plurality of fuel cells, each fuel cell having electrolyte between an oxidant electrode and a fuel electrode, where the modules are each enclosed by a module housing capable of withstanding temperatures of over 600 C., where the module housings are surrounded by an axially-elongated vessel having two ends, such that there is a purge gas space between the module housings and the vessel;
   (2) passing a common gaseous oxidant-purge gas through the vessel to circulate within the purge gas space, where the gas dilutes any unreacted fuel gas flow from the module; and
   (3) passing exhaust gas and circulated purge gas and any unreacted fuel gas out of the vessel, where the vessel is adapted to be used for either atmospheric gaseous feed or pressurized gaseous feed.

8. The method of claim 7, wherein oxidant-purge gas will react with any unreacted fuel gas that passes into the purge gas space.

9. The method of claim 7, wherein both oxidant-purge gas and fuel gas are pressurized, and the oxidant-purge gas consists essentially of air.

10. The method of claim 7, wherein both oxidant-purge gas and fuel gas are pressurized over about 196.4 kPA, and the vessel is tubular.

11. A fuel cell generator apparatus comprising:
   at least one fuel cell assembly module containing a plurality of fuel cells, the fuel cells fueled by a fuel feed injector attached to a fuel feed pre-reformer which is connected to a fuel distribution manifold;

a module housing capable of withstanding temperatures over 600 C. enclosing the fuel cell assembly module;

a vessel surrounding the module housing forming a purge gas space between the module housing and the vessel;

at least one fuel gas feed inlet connecting to the fuel feed injector;

a gaseous oxidant-purge gas feed inlet; and an exhaust gas outlet connecting to a combusted gas plenum associated with the fuel cell assembly module, wherein the vessel is adapted to be used for either atmospheric gaseous feed or pressurized gaseous feed.

12. The fuel cell generator apparatus of claim 11, wherein the fuel cell assembly module comprises at least two side by side subassemblies each containing a plurality of the fuel cells.

13. The fuel cell generator apparatus of claim 12, wherein each fuel cell has an electrolyte between an oxidant electrode and a fuel electrode.

14. The fuel cell generator apparatus of claim 13, wherein the subassemblies are each fueled at their base by the fuel feed injector.

15. The fuel cell generator apparatus of claim 11, wherein the fuel gas feed inlet extends entirely through the vessel.

16. The fuel cell generator apparatus of claim 11, wherein the gaseous oxidant-purge feed inlet extends entirely through the vessel.

17. The fuel cell generator apparatus of claim 11, wherein the exhaust gas outlet extends entirely through the vessel.

18. The fuel cell generator apparatus of claim 11, wherein a semi-flexible duct connects to the combusted gas plenum.

19. The fuel cell generator apparatus of claim 11, wherein insulation contacts the inside of the vessel.

20. The fuel cell generator apparatus of claim 19, wherein at least a portion of the insulation is located within the purge gas space.

* * * * *